United States Patent
Izawa et al.

(10) Patent No.: US 8,203,919 B2
(45) Date of Patent: Jun. 19, 2012

(54) OPTICAL DISC AND OPTICAL DISC APPARATUS

(75) Inventors: Shinsuke Izawa, Chigasaki (JP); Manabu Shiozawa, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/971,936

(22) Filed: Dec. 17, 2010

(65) Prior Publication Data

US 2011/0211432 A1  Sep. 1, 2011

(30) Foreign Application Priority Data

Mar. 1, 2010 (JP) ................................. 2010-043673

(51) Int. Cl.
  *G11B 7/00* (2006.01)
(52) U.S. Cl. ...................... 369/47.5; 369/116
(58) Field of Classification Search .............. 369/47.5, 369/116
  See application file for complete search history.

(56) References Cited

U.S. PATENT DOCUMENTS

| 2010/0039921 A1* | 2/2010 | Shoji et al. ................. 369/275.3 |
| 2010/0118669 A1* | 5/2010 | Maruyama ................. 369/44.27 |
| 2011/0058460 A1* | 3/2011 | Yamamoto et al. .......... 369/47.5 |
| 2011/0194390 A1* | 8/2011 | Hsu et al. ................... 369/47.15 |

FOREIGN PATENT DOCUMENTS

| JP | 61-142538 | 6/1986 |
| JP | 2001-176077 | 6/2001 |
| JP | 2003-178454 | 6/2003 |
| JP | 2005-044421 | 2/2005 |
| JP | 2006-221700 | 8/2006 |

* cited by examiner

*Primary Examiner* — Latanya Bibbins
(74) *Attorney, Agent, or Firm* — McDermott Will & Emery LLP

(57) ABSTRACT

The invention provides an optical disc apparatus which prevents that a laser beam whose power is set at a read power level causes erroneous data recording or deletion. The optical disc apparatus includes an emission controller which controls an amount of an electrical current that a current supply portion supplies to a laser diode in order to control a level of emission power at which the laser diode emits the laser beam. The emission controller has a function to set levels of the emission power at the following transition processings: a transition processing after a read processing and before a write processing, a transition processing after a write processing and before a read processing, a transition processing between two read processings for respective areas, and a transition processing between two write processings for respective areas.

18 Claims, 4 Drawing Sheets

OPTICAL DISC AND OPTICAL DISC APPARATUS

CLAIM OF PRIORITY

The present application claims priority from Japanese patent application serial No. JP 2010-043673, filed on Mar. 1, 2010, the content of which is hereby incorporated by reference into this application.

BACKGROUND OF THE INVENTION (1) Field of the Invention

The present invention relates to a method of controlling a laser beam in an optical disc apparatus.

(2) Description of the Related Art

When data is reproduced or read from a rewritable optical disc in an optical disc apparatus, the disc is irradiated with a laser beam at a power level that does not cause erroneous recording and deletion on and from a recorded area which is an area where data is already recorded. As the related art, JP-A-2006-221700, for instance, discloses a technique where recording or write is performed with a laser beam at a power level lowered to a level at which read is implemented, so as to prevent erroneous recording and deletion on and from a recorded area in the event of defocus, thereby preventing data damage.

SUMMARY OF THE INVENTION

As the digital media technology develops, the volume of data dealt by individual users is increasing year by year, inducing demand for further increase in the capacity of optical discs. As a measure to meet the demand, there is known to multilayer a recording layer of an optical disc, and two-layered disc, i.e., a disc whose recording layer is of two-layered structure or a disc having two recording layers, is already in practical use. It is expected that multilayer discs having three, four or more recording layers will be standardized in future in order to further increase the capacity of optical discs. Hereinafter, an optical disc having a plurality of recording layers or having a recording layer of multilayer structure will be referred to as a "multilayer disc".

In a multilayer disc, the recording layers may differ in their appropriate read power level. When the focal point of a laser beam is moved from a recording layer where the read power level, i.e., a level of power of the laser beam at which read is to be performed, is relatively high to another recording layer where the read power level is relatively low, erroneous recording or deletion on or from a recorded area may occur depending on the setting of the intensity of the laser beam, and such erroneous recording or deletion damages data. In a further case where the focal point is erroneously moved to a recording layer that is not a target layer, too, data at a recorded area may be damaged.

This invention was developed in view of the above-described situations, and it is an object to provide an optical disc apparatus that can prevent that a laser beam whose power is set at a read power level causes erroneous data recording or deletion. The object is attained by the invention defined in the appended claims, for instance. According to the invention, there can be provided an optical disc apparatus that prevents that a laser beam whose power is set at a read power level causes erroneous data recording or deletion.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Figure 1:
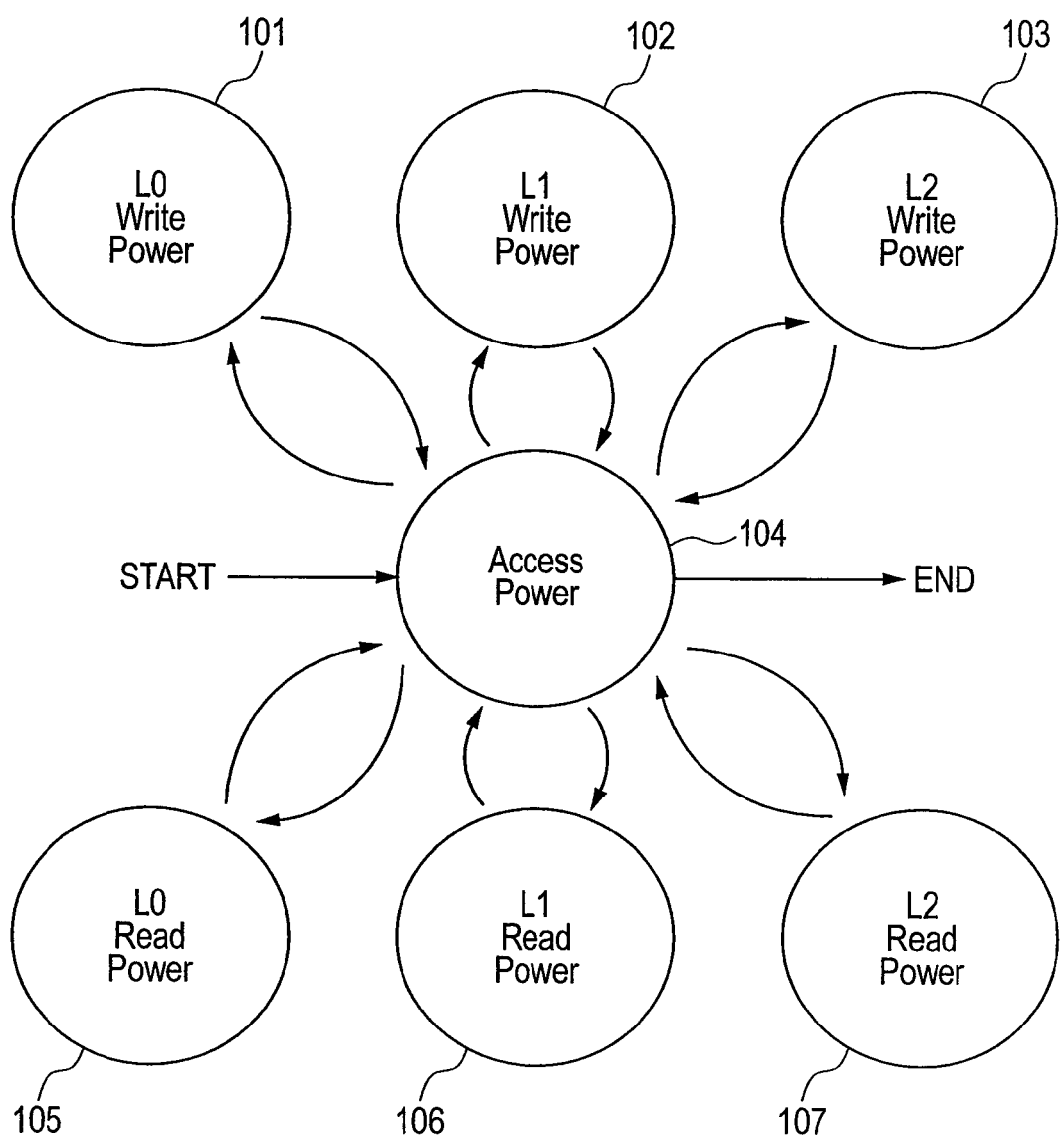
FIG. 1 is a state transition diagram showing how the level of an emission power is switched in an optical disc apparatus according to an embodiment of the invention.

Hereinafter, there will be described one embodiment of the invention by referring to the drawings.

In FIG. 1 is shown one example of a state transition diagram used in an optical disc apparatus according to the embodiment. It is noted that although in the following description of the embodiment a rewritable optical disc of three-layered structure, i.e., a rewritable optical disc having three recording layers, is illustrated, the optical disc of the embodiment may be otherwise. That is, the number of recording layers is not limited to three but may be two or four or more. Further, a recordable optical disc may be used. Hereinafter the terms "read power" and "write power" refer to levels of the power of a laser beam that is focused on the optical disc when read and write are implemented, respectively.

According to the embodiment, there is used an emission power level 104 which corresponds to a level of light intensity that is different from that of write power levels 101, 102, 103 and read power levels 105, 106, 107. Hereinafter, the power level 104 will be referred to as "access power". It is noted that although in the embodiment a single value of access power level is used, the number of values of access power level is not limited to one but may be two or more. The power of the laser beam is set at the access power level when a predetermined state is established while neither write nor read is performed. The beam power level is switched to the access power level from write power levels and read power levels of the respective recording layers.

Although not shown in FIG. 1, it is not essential to switch the power level once to the access power level. For instance, the power level may be switched from the read power level L0 directly to the write power level L0, from the read power level L1 directly to the write power level L1, or from the read power level L2 directly to the write power level L2. That is, it suffices that the access power level is set at a value to which the power level can be switched from any of the read and write power levels.

The switching to the access power level is implemented when the position of a focal point is moved from one of the recording layers on which the laser beam is focused to another layer. The setting the emission power at the access power level when the focal point movement is performed can prevent erroneous recording and deletion on and from a recorded area in a target layer to which the focal point is to be moved and in each recording layer across which the focal point is moved, thereby preventing data damage. More specifically, when a drive signal is received to drive an objective lens so as to move a focal point to a target layer that is not a layer on which the focal point currently is, the power level of the laser beam is switched to the access power level from a currently set power level that is one of the read and write power levels. While the focal point is being moved to the target layer, the laser beam is emitted at the access power level. After the position of the focal point is moved to the target layer, the emission power is switched to the read power level. The timing at which the beam power level is switched from the access power level is not limited to that described above, but the switching from the access power level may be implemented when it is determined by reading a wobble that the layer to which the focal point has been moved is the target layer. Further, it may be arranged such that while neither write nor read is performed, the power level is set at the access power level. Still further, it may be arranged such that the power level is switched from the access power level to the write or read power level when a write or read address is read, and is switched from the write or read power level to the access power level when an address at which write and read is terminated is read. Further, the beam power level may be suitably switched to one of the access power level, the read power level, and the write power level from another upon loading of the optical disc or adjustment of the setup.

The access power level is predetermined to be not lower than the lowest power level that enables generation of a focus error signal. For instance, the access power level may be set to be not higher than the lowest power level that can assure a predetermined reproduction quality with respect to all of the recording layers when read has been repeated in a predetermined number of times at the power level. For instance, the access power level may be the same with the lowest one of the read power levels for the respective recording layers, or alternatively the access power level may be a predetermined power level that satisfies the above-described condition. Further, an access power level satisfying the condition may be obtained at the time of adjustment after loading of the optical disc. For instance, such an access power level is obtained as follows. First, a non-recorded area in a management area in each of the recording layers is read with a laser beam at a power level. That is, the non-recorded areas of the respective recording layers are irradiated at a same light intensity in order to obtain reflected light from each of the non-recorded areas. Since the recording layers differ from one another in reflectance and transmittance, the level of read signals obtained from the reflected light differs among the recording layers. It is possible to estimate optical sensitivities of the respective recording layers from the difference in the signal level. By the above-described signal observation, an appropriate access power level can be obtained.

It is noted that the access power level is not limited to a single value, but may take a plurality of values as long as the values satisfy the above-described condition. For instance, in a multilayer disc having a large number of layers such as six or eight, the farthest one of the layers from the objective lens and the nearest layer thereto may greatly differ from each other in optical sensitivity, as well as in the required light intensity of the access power level. In such a case, e.g., in a case where the disc is six-layered, the access power level may be differentiated between the nearer three layers and the farther three layers. In this case, it is arranged such that each of the access power levels of the two layer groups, i.e., the nearer three and the farther three, satisfies the above-described condition in the respective groups, and such that both the access power levels satisfy the condition at two border layers that are layers adjacent to a border at which the access power level changes. Further, when a focal point is moved, the position of the focal point is kept observed. When the emission power is not the set value of access power level for the layer at which the focal point currently exists, the emission power is switched to the set value. This arrangement prevents data damage since the focal point can be continuously moved from the farther layer group for which a first access power level is employed to the nearer layer group for which a second access power level is employed, by switching the power level from the first access power level to the second access power level while the focal point passes across the border layers.

Figure 2:
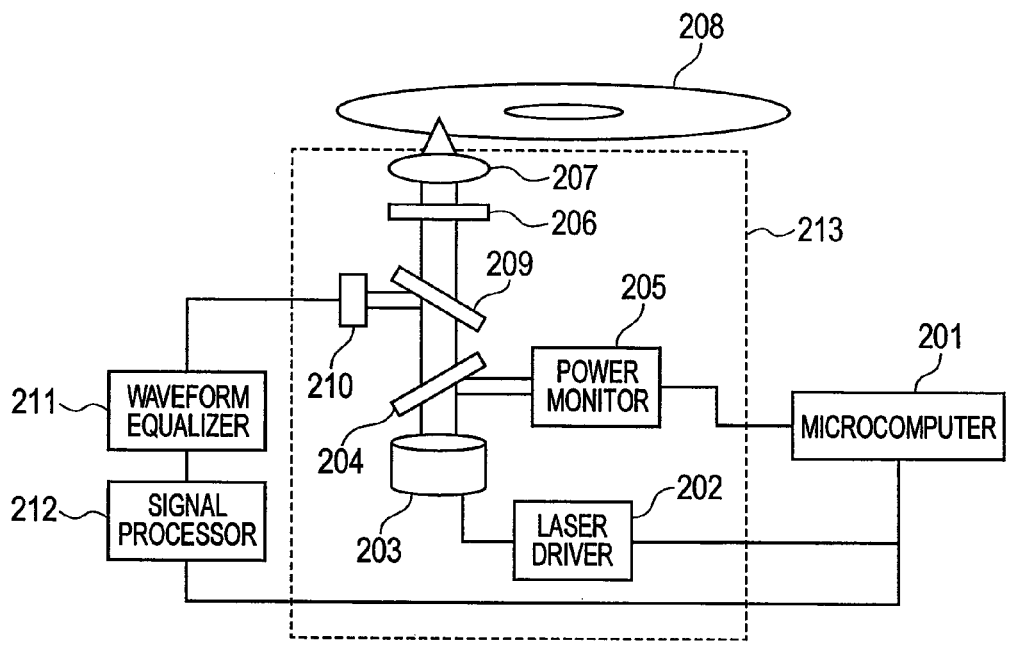
FIG. 2 is a diagram of the optical disc apparatus.

FIG. 2 is a block diagram of the optical disc apparatus according to the embodiment. It is noted that elements that are not directly related to the embodiment are not shown in FIG. 2. As shown in FIG. 2, the optical disc apparatus of the embodiment mainly includes a microcomputer 201, a waveform equalizer 211, a signal processor 212, and a light pickup 213. The light pickup 213 includes a laser driver 202, a laser diode 203, a beam splitter 204, a power monitor 205, a quarter wave plate 206, an objective lens 207, a polarizing beam splitter 209, and a detector 210.

The microcomputer 201 of the optical disc apparatus communicates with a host apparatus such as PC through an interface (not shown) such as ATAPI. The microcomputer 201 controls light emission though the laser driver 202. In accordance with the control by the microcomputer 201, the laser driver 202 outputs an electrical current to operate the laser diode 203. The laser diode 203 emits light or a laser beam at the emission power level corresponding to the drive current from the laser driver 202. The embodiment is realized by switching the emission power of the laser diode 203 between the write and read power level (s) and the access power level, as desired. The power monitor 205 detects the emission power of the laser diode 203 via the beam splitter 204 and converts the detected emission power level to a voltage value, which is outputted to the microcomputer 201. The quarter wave plate 206 creates a quarter-wavelength phase shift of the laser beam having passed through the beam splitter 204, thereby changing its polarization direction. The objective lens 207 focuses the laser beam onto an optical disc 208. As described later, the invention is realized by having the laser diode 203 emitting a laser beam at the access power level when the objective lens 207 is operated or driven. Although in FIG. 2 is shown an example where the laser diode 203 and the power monitor 205 are installed as two discrete parts, a laser diode packaged with the power monitor 205 may be used instead. The laser diode packaged with the power monitor detects the power level and outputs the detected power level to the microcomputer 201. In some cases, employing such a laser diode packaged with the power monitor facilitates space saving and the control in designing the light pickup 213.

The laser beam reflected by the optical disc 208 retains information on the disc in the form of change in the light intensity. When a read is implemented, the laser beam reflected by the optical disc 208 is changed in its polarization direction by the quarter wave plate 206. The laser beam is reflected by the polarizing beam splitter 209 and focused onto the detector 210, which detects the laser beam and outputs a signal corresponding to the laser intensity to the waveform equalizer 211, at which the waveform of the signal detected by the detector 210 is subjected to various processings such as equalization and amplification and then outputted to the signal processor 212. The signal processor 212 performs various signal processings, e.g., analog-digital conversion, equalization and decoding, on the signal waveform outputted from the waveform equalizer 211, and outputs the decoded data to the microcomputer 201. Write on the optical disc 208 is implemented by having the laser diode 203 emit a laser beam in an emission waveform corresponding to a drive current after an OPC (Optical Power Control) operation performed on and within an OPC area, and focusing the laser beam onto the optical disc 208 by the objective lens 207. It is noted that the optical disc apparatus has been described only for representing one example of a structure of an optical disc apparatus for implementing an operation of the embodiment, and the optical disc apparatus may be otherwise structured as long as the operation of the embodiment can be implemented.

According to the embodiment, the objective lens 207 is driven while a laser beam is emitted at the access power level. It is required that when write or read is performed on a multilayer disc, the focal point of the laser beam emitted from the laser diode 203 be switchable or movable among the recording layers, as desired. The switching or movement of the focal point is implemented by driving the objective lens 207.

Figure 3:
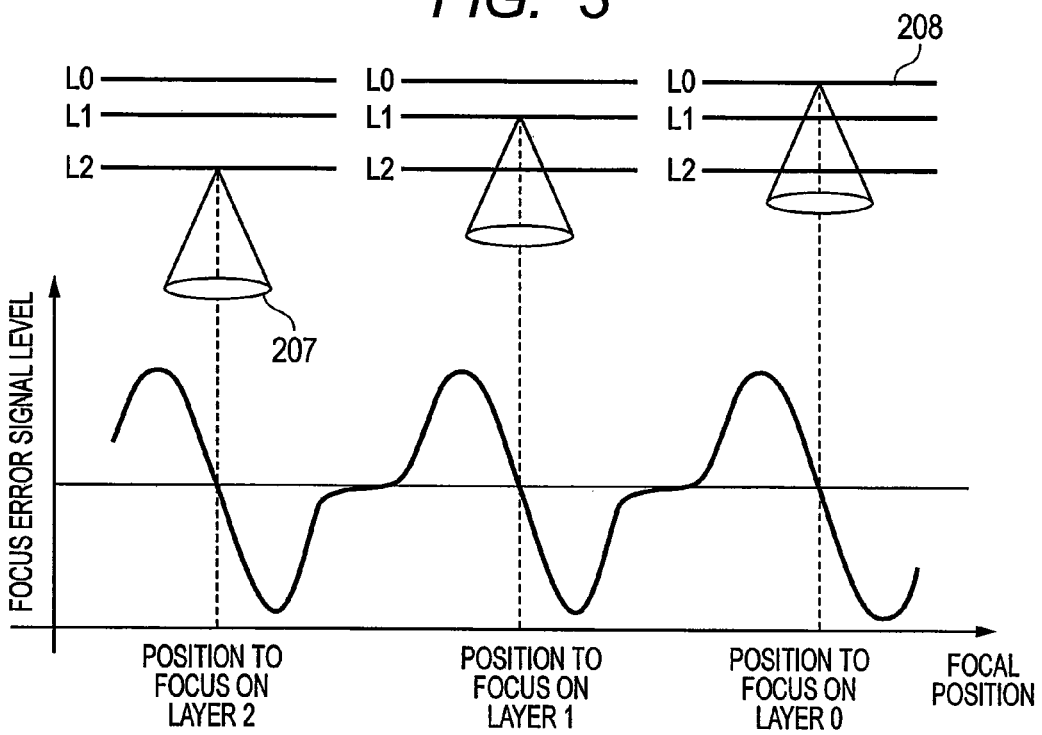
FIG. 3 is a graph showing change in a focus error signal with movement of a focal point on an optical disc having a recording layer of three-layered structure.

FIG. 3 shows one example of the operation or drive of the objective lens 207 according to the embodiment. Although in the description below a three-layered rewritable optical disc is illustrated, an optical disc of which the number of recording layers is not three but two or four or more may be used.

Referring to FIG. 3, the optical disc 208 is a rewritable optical disc having three recording layers L0, L1, L2, and a laser beam emitted from the laser diode 203 is focused onto a desired one of the recording layers by operating or driving the objective lens 207. By driving the objective lens 207 in a direction perpendicular to the recording layers of the optical disc 208, a focus error signal, which is generally called S-signal or S-shaped signal and indicative of a positional error between the recording layers and the focal point, is detected for each of the recording layers. In the embodiment using the three-layered disc, three S-signals or focus error signals are detected, and it is enabled to move the focal point from one layer to another by observing the three S-signals.

In a multilayer disc, recording films of the recording layers may be differentiated from one another in their composition and structure in order to adjust reflectance and transmittance values thereof. In such a case, the layers of the multilayer disc differ from one another in their light sensitivity, and accordingly in noise in their reflected light as well as their resistance to a laser beam of a same light intensity emitted to read data. Thus, a multilayer disc is sometimes such that its layers differ from one another in the appropriate value of read power level. Thus, when a focal point of the laser beam is moved from one layer to another layer as a target layer, there can occur damage of recorded data due to erroneous recording or deletion on or from a recorded area in the target layer and each layer across which the focal point is moved. According to the embodiment, in order to prevent the damage of recorded data, the emission power of the laser beam is set at the access power level when the focal point is moved.

Figure 4:
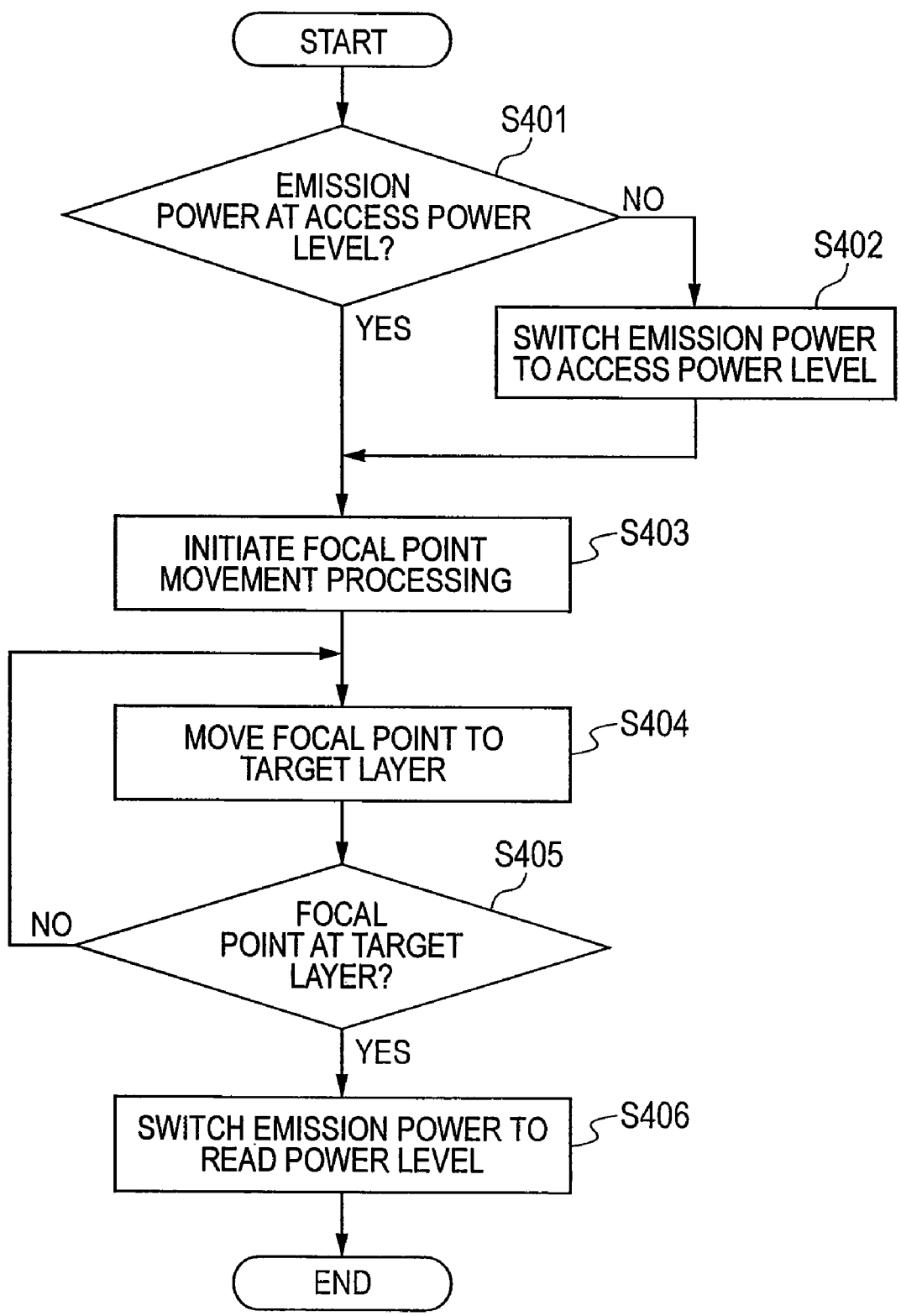
FIG. 4 is a flowchart related to setting of the emission power from a time of initiation of a read or a write to a time of completion thereof.

FIG. 4 is a flowchart illustrating one example of setting of the access power level at the time of a focal point movement according to the embodiment. It is noted that description of parts not directly related to the example is omitted. The flowchart begins with step S401 in which it is determined whether the currently set level of the emission power is the access power level. When the emission power is not currently set at the access power level, a negative decision (NO) is obtained in step S401, and the flow goes to step S402 to set the emission power at the access power level. The flow then goes to step S403 to obtain a drive signal based on which the objective lens 207 is to be driven to move the focal point to a layer as the target layer, and in the following step S404 the focal point is moved to the target layer. Then the flow goes to step S405 to determine whether the layer at which the focal point currently exists is the target layer. When the layer at which the focal point currently exists is not the target layer, a negative decision (NO) is obtained in step S405, and the emission power level is not changed and is kept at the access power level and the flow returns to step S404 to keep moving the focal point toward the target layer. When the focal point has reached the target layer, a positive decision (YES) is obtained in step S405 and the flow goes to step S406 to switch the emission power from the access power level to the read power level. When the focal point is further moved, steps S401-S406 are repeated.

It is noted that a timing at which the emission power level is set at the access power level at the laser driver 202 and a timing at which the emission power level is switched from the access power level to the read power level or the write power level are not limited to those described above with respect to FIG. 4, but may be those described further above.

The embodiment may be modified such that irrespective of whether the objective lens 207 is driven or not, whenever the laser diode 203 is operated to emit a laser beam neither for implementing read nor write, the emission power of the laser diode 203 is set at the access power level. As described above, recording layers of a multilayer disc differ from one another in their light sensitivity, and accordingly in noise in reflected light thereof as well as their resistance to a laser beam of a same light intensity. Thus, the appropriate read power level may differ among the recording layers. According to the embodiment, when neither write nor read is performed, the emission power is set at the access power level with respect to all the recording layers, i.e., all the recording layers are irradiated at a same light intensity, instead of setting the emission power at read power levels for the respective recording layers, i.e., irradiating the recording layers at different light intensities respectively corresponding to the recording layers. By this arrangement, data damage due to a focal point error and a movement of the focal point is prevented.

Figure 5:
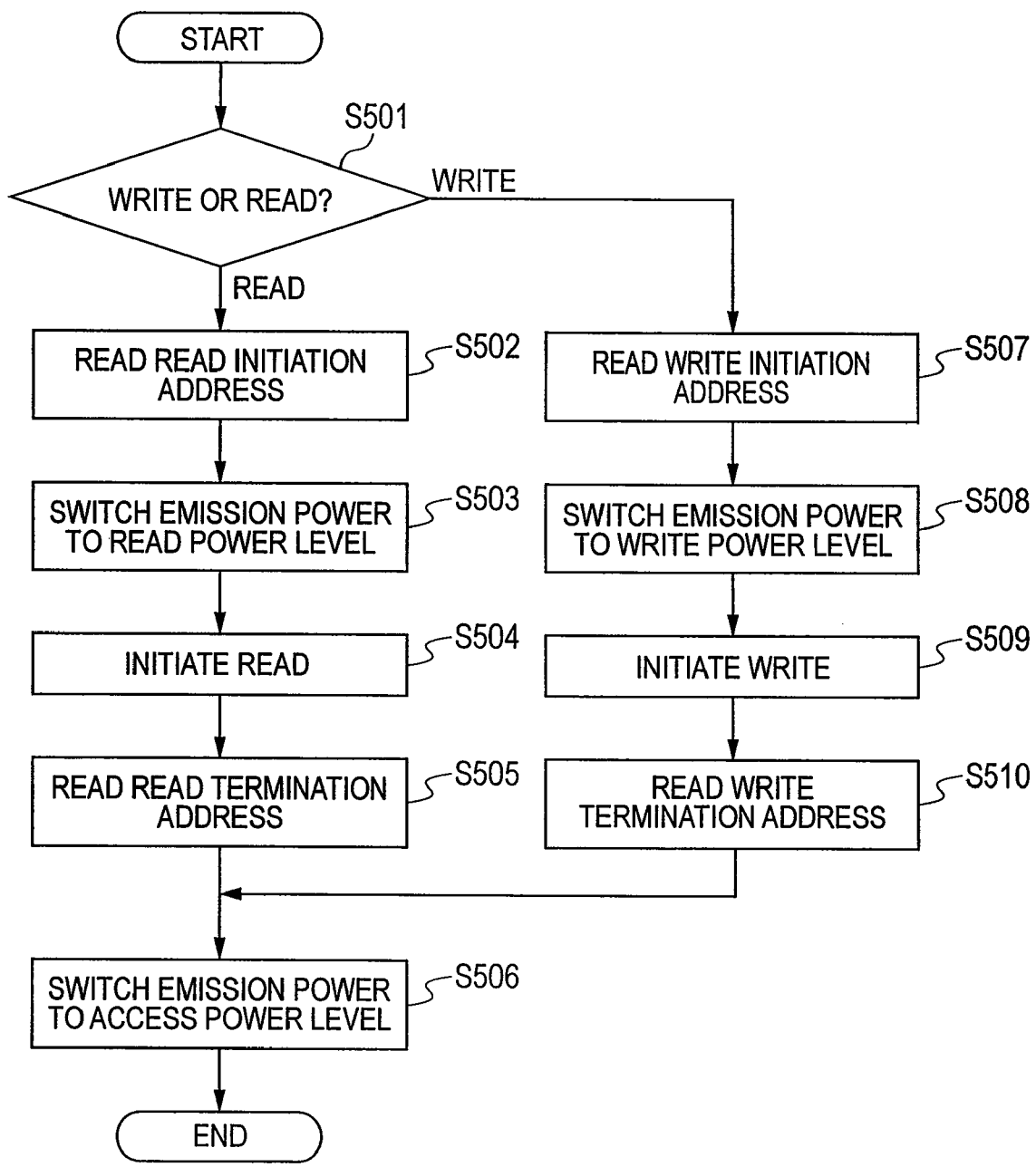
FIG. 5 is a flowchart related to setting of the emission power from a time of initiation of a focal point movement to a time of completion thereof.

FIG. 5 is a flowchart illustrating one example of switching of the emission power between the access power level and the read power level, and between the access power level and the write power level, according to the embodiment. It is noted that description of parts not directly related to the example is omitted. The flow begins with step S501 in which it is determined whether a processing to be implemented is of a read or of a write. When the processing to be implemented is of a read, the flow goes to step S502 to read a read initiation address from which read is to be started, and then goes to step S503 in which the emission power level set at the laser driver 202 is switched to the read power level of the recording layer at which the laser beam is currently focused. In the next step S504, data is read or reproduced. Then the flow goes to step S505 in which a read termination address at which the read is to be ended is read, and then goes to step S506 to switch the emission power set at the laser driver 202 to the access power level, therewith terminating the flow. Similarly, when the processing to be implemented is of a write, it is determined in step S501 that the processing to be implemented is of a write and the flow goes to step S507 to read a write initiation address from which write is to be started. Then, the flow goes to step S508 in which the emission power level set at the laser driver 202 is switched to the write power level of the recording layer at which the laser beam is currently focused. In the next step S509, data is written or recorded. Then the flow goes to step S510 in which a write termination address at which the write is to be ended is read, and then goes to step S506 to switch the emission power set at the laser driver 202 to the access power level, therewith terminating the flow. When a read processing or a write processing is additionally implemented, steps S501-S510 are repeated.

There will be described one example of the optical disc of the embodiment. The optical disc 208 is produced to include a read-only track between a data area and a center hole. Within the read-only track is recorded disc information which is information on the optical disc 208. The disc information includes information on the emission power in the form of the read power level and the write power level. In this example, as the information on the emission power, three kinds of power information, namely, the read power level, the write power level and the access power level are included in the disc information, which is recorded at an ADIP (Address In Pregroove) within a wobble portion.

Although in the above description the disc is produced to include the disc information including the recommended power levels within a wobble portion, this is not essential and the disc information may be recorded within a BCA (Burst Cutting Area) where information can be additionally recorded after production of the disc. Further, the disc information may be recorded as a reproduction signal in the form of a recording mark or recording bits within an area other than a user data area. The disc information may be recorded on recording layers such that information on the respective recording layers is recorded on the corresponding layers, or such that information on all the recording layers is recorded on a single recording layer or alternatively on all the recording layers.

It is noted that the embodiment has been described to illustrate the invention and by way of example only, and the invention is not limited to details of the embodiment but may be embodied with various modifications. For instance, it is not essential to include all the features described with respect to the embodiment. Further, a part of the features of each embodiment may be replaced by a feature or features of another embodiment. Further, each embodiment may additionally include a feature or features of another embodiment. Yet further, a part of the features of each embodiment may additionally include another feature or features, may be omitted, or may be replaced by another feature or features.

What is claimed is:

1. An optical disc apparatus which reads information from an optical disc using a laser beam, the apparatus comprising:
   a laser diode;
   a current supply portion which supplies an electrical current for emitting the laser beam from the laser diode; and
   an emission controller which controls an amount of the electrical current that the current supply portion supplies to the laser diode in order to control a level of emission power at which the laser diode emits the laser beam;
   the emission controller having a function to set the level of the emission power at a time of at least one of the following transition processings: a transition processing after a read processing and before a write processing, a transition processing after a write processing and before a read processing, a transition processing between two read processings for respective areas, and a transition processing between two write processings for respective areas,
   wherein the optical disc has a plurality of layers having respective levels of resistance to a laser beam emitted for reading, and the emission controller sets the emission power at the time of the at least one transition processing at a level not higher than a read power level for the layer that has the lowest resistance.

2. The optical disc apparatus according to claim 1, wherein the at least one transition processing includes a movement of a focal point of the laser beam from one of the layers to another layer as a target layer.

3. The optical disc apparatus according to claim 2, wherein after the at least one transition processing is completed, the emission controller sets the emission power at a read power level or a write power level for the target layer.

4. The optical disc apparatus according to claim 1, wherein the emission controller sets the emission power at the time of the at least one transition processing at a level capable of generating a focus error signal.

5. An optical disc apparatus which reads information from an optical disc using a laser beam, the apparatus comprising:
   a laser diode;
   a current supply portion which supplies an electrical current for emitting the laser beam from the laser diode; and
   an emission controller which controls an amount of the electrical current that the current supply portion supplies to the laser diode in order to control a level of emission power at which the laser diode emits the laser beam;
   the emission controller having a function to set the level of the emission power at a time of at least one of the following transition processings: a transition processing after a read processing and before a write processing, a transition processing after a write processing and before a read processing, a transition processing between two read processings for respective areas, and a transition processing between two write processings for respective areas,
   wherein the optical disc has a plurality of layers having respective levels of resistance to a laser beam emitted for reading, and the emission controller sets the emission power at the time of the at least one transition processing at a level that can assure a predetermined reproduction quality with respect to one of the layers that has the lowest resistance when read is repeatedly performed on the optical disc a predetermined number of times at the power level.

6. The optical disc apparatus according to claim 5, wherein the at least one transition processing includes a movement of a focal point of the laser beam from one of the layers to another layer as a target layer.

7. The optical disc apparatus according to claim 6, wherein after the at least one transition processing is completed, the emission controller sets the emission power at a read power level or a write power level for the target layer.

8. The optical disc apparatus according to claim 5, wherein the emission controller sets the emission power at the time of the at least one transition processing at a level capable of generating a focus error signal.

9. An optical disc apparatus which reads information from an optical disc using a laser beam, the apparatus comprising:
   a laser diode;
   a current supply portion which supplies an electrical current for emitting the laser beam from the laser diode; and
   an emission controller which controls an amount of the electrical current that the current supply portion supplies to the laser diode in order to control a level of emission power at which the laser diode emits the laser beam;
   the emission controller having a function to set the level of the emission power at a time of at least one of the following transition processings: a transition processing after a read processing and before a write processing, a transition processing after a write processing and before a read processing, a transition processing between two read processings for respective areas, and a transition processing between two write processings for respective areas,
   wherein the emission controller sets the emission power at the time of the at least one transition processing at a level determined based on a signal obtained from reflected light from the respective layers when the layers are irradiated with a laser beam at a same power level.

10. A reading method which reads information from an optical disc using a laser beam, the method comprising steps of:
   a current supply step which supplies an electrical current to a laser diode for emitting the laser beam from the laser diode; and
   an emission control step which controls an amount of the electrical current that is supplied to the laser diode in order to control a level of emission power at which the laser diode emits the laser beam, wherein:
   the emission control step comprises setting the level of the emission power at the time of at least one of the following transition processings: a transition processing after a read processing and before a write processing, a transition processing after a write processing and before a read processing, a transition processing between two read processings for respective areas, and a transition processing between two write processings for respective areas, and
   the optical disc has a plurality of layers having respective levels of resistance to a laser beam emitted for reading, and the emission control step sets the emission power at the time of the at least one transition processing at a level not higher than a read power level for the layer that has the lowest resistance.

11. The reading method according to claim 10, wherein the at least one transition processing includes moving a focal point of the laser beam from one of the layers to another layer as a target layer.

12. The reading method according to claim 11, wherein after the at least one transition processing is completed, the emission control step sets the emission power at a read power level or a write power level for the target layer.

13. The reading method according to claim 10, wherein the emission control step sets the emission power at the time of the at least one transition processing at a level capable of generating a focus error signal.

14. A reading method which reads information from an optical disc using a laser beam, the method comprising steps of:
   a current supply step which supplies an electrical current to a laser diode for emitting the laser beam from the laser diode; and
   an emission control step which controls an amount of the electrical current that is supplied to the laser diode in order to control a level of emission power at which the laser diode emits the laser beam, wherein:
   the emission control step comprises setting the level of the emission power at a time of at least one of the following transition processings: a transition processing after a read processing and before a write processing, a transition processing after a write processing and before a read processing, a transition processing between two read processings for respective areas, and a transition processing between two write processings for respective areas, and
   the optical disc has a plurality of layers having respective levels of resistance to a laser beam emitted for reading, and the emission control step sets the mission power at the time of the at least one transition processing at a level that can assure a predetermined reproduction quality with respect to one of the layers that has the lowest resistance when read is repeatedly performed on the optical disc in a predetermined number of times at the power level.

15. The reading method according to claim 14, wherein the at least one transition processing includes moving a focal point of the laser beam from one of the layers to another layer as a target layer.

16. The reading method according to claim 15, wherein after the at least one transition processing is completed, the emission control step sets the emission power at a read power level or a write power level for the target layer.

17. The reading method according to claim 14, wherein the emission control step sets the emission power at the time of the at least one transition processing at a level capable of generating a focus error signal.

18. A read method which read information form an optical disc using a laser beam, the method comprising steps of:
   a current supply step which supplied an electrical current to a laser diode for emitting the laser beam from the laser diode; and
   an emission control step which controls an amount of the electrical current that is supplied to the laser diode in order to control a level of emission power at which the laser diode emits the laser beam, wherein:
   the emission control step has a function to set the level of the emission power at a time of at least one of the following transition processing: a transition processing after a read processing and before a write processing, a transition processing after a write processing and before a read processing, a transition processing between two read processings for respective areas, and a transition processing between two write processings for respective areas, and
   the emission control step sets the emission power at the time of the at least one transition processing at a level determined based on a signal obtained from reflected light from the respective layers when the layers are irradiated with a laser beam at a same power level.

\* \* \* \* \*